No. 726,927.

Patented May 5, 1903.

UNITED STATES PATENT OFFICE.

HARRY J. HOFFMAYR, OF VENTURA, CALIFORNIA.

PROCESS OF BLEACHING NUTS.

SPECIFICATION forming part of Letters Patent No. 726,927, dated May 5, 1903.

Application filed January 2, 1903. Serial No. 137,576. (No specimens.)

*To all whom it may concern:*

Be it known that I, HARRY J. HOFFMAYR, a citizen of the United States, residing at Ventura, in the county of Ventura and State of California, have invented a new and useful Process of Cleaning and Bleaching Walnuts and Almonds, of which the following is a specification.

I accomplish the cleaning and bleaching of the walnuts and almonds by means of the application thereto of the following mixture in the following manner, viz: The mixture is obtained as follows:

1. Dissolve one-quarter of a pound of oxalic acid in one gallon of water.

2. Dissolve one-half pound of hyposulfite of soda ($H_2S_2O_3$) in one gallon of water.

3. To twenty-five pounds of white-pine sawdust add and thoroughly mix (*a*) one-eighth pint of the oxalic-acid solution mentioned in paragraph 1 and (*b*) one-quarter of a pint of the hyposulfite-of-soda solution mentioned in paragraph 2.

4. Add to this combination one pint of sulfuric acid fifty-two per cent. strong in enough water to thoroughly dampen the sawdust.

The said twenty-five pounds of sawdust prepared pursuant to the above formula is intended to and should properly bleach and clean two hundred and fifty pounds of nuts.

*Mode of application.*—The said mixture is applied as follows: Place the nuts to be cleaned and bleached in a cylinder. The cylinder is then rotated at a speed of about eighty revolutions per minute for five minutes or more, after which the nuts are dumped out onto a one-half-inch wire-mesh screen for the purpose of separating the sawdust from the nuts. The nuts are then transferred onto a wooden-slat screen one-half-inch mesh and the sawdust thoroughly washed off with clear water. When the nuts are thoroughly washed, the same are put on trays and dried, after which they are packed for the market.

Having described my invention, what I claim as new, and desire to secure by Letters Patent, is—

The herein-described process for cleaning and bleaching nuts by treating them with a mixture comprising a solution of oxalic acid, hyposulfite of soda and water in the proportions herein stated, mixing the same in sawdust and adding thereto a solution of sulfuric acid and water to thoroughly dampen the same, then agitating the nuts in said mixture and then drying them, substantially as herein described.

In witness that I claim the foregoing I have hereunto subscribed my name this 26th day of December, 1902.

HARRY J. HOFFMAYR.

Witnesses:
 N. BLACKSTOCK,
 ORESTES ORR.